United States Patent

[11] 3,593,139

[72] Inventor David E. Hershberg
Livingston, N.J.

[21] Appl. No. 740,870
[22] Filed June 28, 1968
[45] Patented July 13, 1971

[73] Assignee International Telephone and Telegraph Corporation
Nutley, N.J.

[54] TRANSPONDER
8 Claims, 1 Drawing Fig.

[52] U.S. Cl. .......... 325/9, 325/4, 330/34
[51] Int. Cl. .......... H04b 1/59
[50] Field of Search .......... H04b/7/14; 325/1, 4, 9, 7, 13; 330/34; 307/322; 343/6.8; 329/449

[56] References Cited

UNITED STATES PATENTS

| | | | |
|---|---|---|---|
| 2,017,126 | 10/1935 | Kroger .......... | 325/9 X |
| 3,051,846 | 8/1962 | Schott .......... | 307/88.5 |
| 3,098,973 | 7/1963 | Wickersham, Jr. et al. .. | 325/375 |
| 3,272,996 | 9/1966 | Wen Yuan Pan .......... | 307/88.5 |

*Primary Examiner*—Robert L. Richardson
*Attorneys*—C. Cornell Remsen, Jr, Walter J. Baum, Percy P. Lantzy, Philip M. Bolton, Isidore Togut and Charles L. Johnson, Jr.

ABSTRACT: An RF signal in one RF range is amplified and amplitude limited by a three stage tunnel diode amplifier, a mixer and local oscillator operate on the RF signal output of the three stage amplifier to translate the RF signal to a different RF range, a single stage tunnel diode amplifier amplifies and amplitude limits the output of the mixer and a TWT amplifier transmits the output of the single stage amplifier. Where tracking is required, such as in a satellite transponder, a frequency multiplier coupled to the oscillator produces an RF tracking signal outside the translation frequency range which is transmitted by the TWT amplifier simultaneously with the translated RF signal.

PATENTED JUL 13 1971 3,593,139
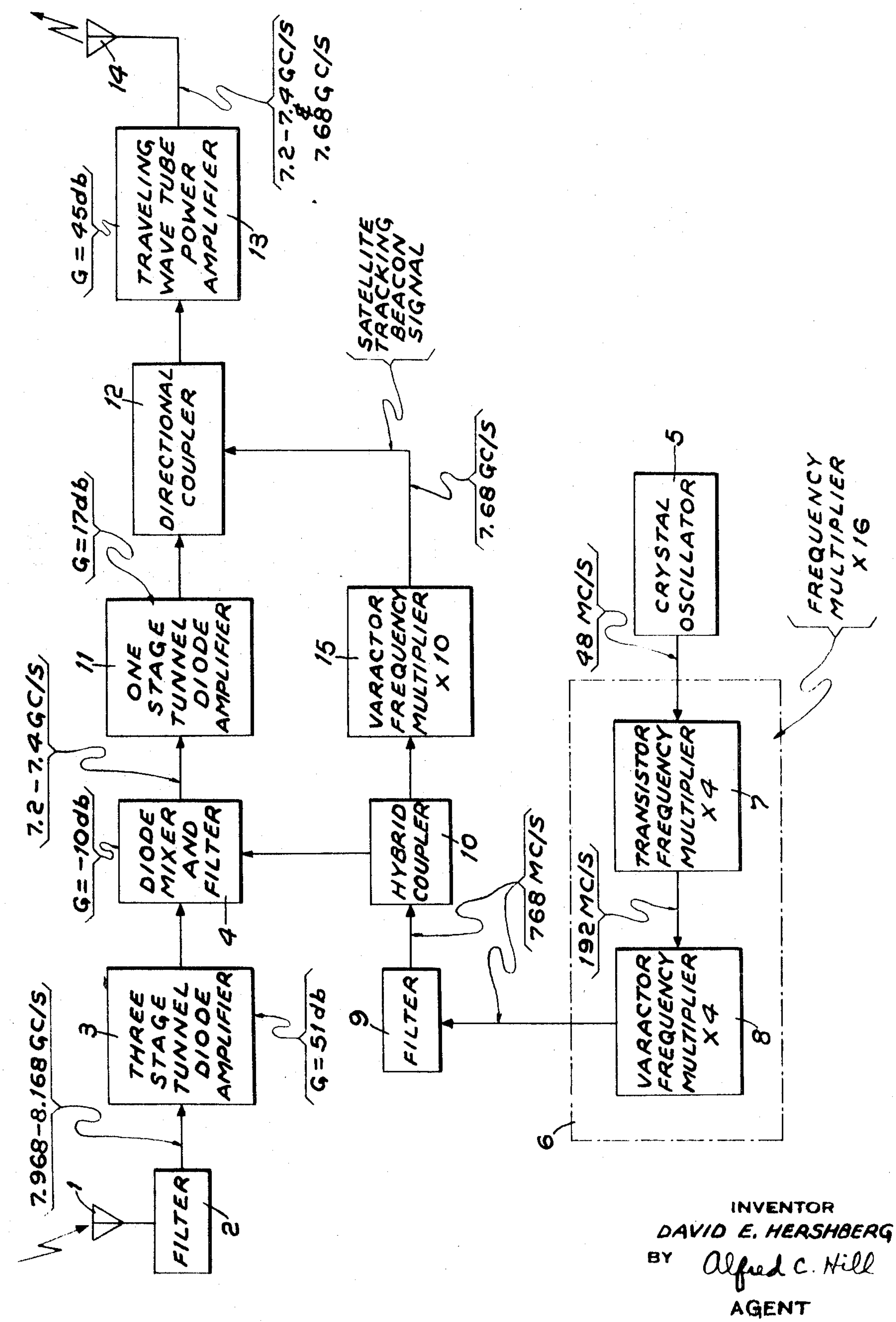
INVENTOR
DAVID E. HERSHBERG
BY Alfred C. Hill
AGENT

TRANSPONDER

BACKGROUND OF THE INVENTION

This invention relates to transponders and more particularly to wideband limiting transponders.

Transponders commonly employ a receiver to receive a signal transmitted thereto and a transmitter to transmit the signal received. The received signal is processed prior to transmission in a circuit arrangement intermediate the receiver and transmitter. This processing may take a number of different forms depending upon the application of the complete overall system in which the transponder is incorporated. Many systems include a transponder, such as radar systems, radio direction finding systems, distance measuring systems and communication systems. In communication systems, a transponder is commonly referred to as a relay or repeater terminal. The term "transponder" is employed herein as a generic term incorporating the above-identified equipment employed in a transponder for all the various applications thereof as mentioned hereinabove. With regard to communication systems employing the transponder of this invention it is to be understood that the transponder may be incorporated in a line-of-sight communication system, a tropospheric scatter system employing repeater terminals and in a satellite communication system wherein the satellite carries the transponder.

In transponders of the prior art, the signal received was in an RF (radio frequency) range and was down-converted to an intermediate frequency (IF) range, then amplified and amplitude limited in this IF range and then up-converted to an appropriate RF range for transmission. The need for amplitude limiting the received signal is to provide immunity in the transponder to large amplitude interfering signals to prevent these interfering signals from taking over or capturing the transponder equipment and rendering the desired intelligence signal, such as distance information, direction information, data, voice and the like, unintelligible and thereby render the transponder useless. As pointed out hereinabove, the prior art arrangements amplitude limited to provide the desired immunity to noise or large amplitude interference signals in the IF signal range.

Tunnel diode amplifiers are known in the prior art to be RF signal amplifiers. There is a disadvantage to such an amplifier, however, in that there is a point in its operating characteristic that limits the signal and, therefore, has been impractical for certain applications in the past, since this limiting characteristic of the tunnel diode is normally undesirable.

SUMMARY OF THE INVENTION

An object of the present invention is the provision of a transponder wherein the processing of the signal after reception and prior to transmission is accomplished completely in the RF range.

Another object of this invention is the provision of a transponder having wide dynamic and static bandwidth, large dynamic amplitude range, and low amplitude modulation/phase modulation (AM/PM) conversion.

A further object of the present invention is the provision of a transponder incorporating tunnel diode amplifiers which employs the heretofore undesirable limiting characteristic of the tunnel diode amplifiers to an advantage in achieving the wideband limiting transponder of this invention operating completely in the RF range.

A feature of this invention is to provide a transponder comprising first means to receive a radio frequency signal disposed in a first radio frequency range; second means coupled to the first means to amplify and amplitude limit the first radio frequency signal; third means to frequency translate the first radio frequency signal to a second radio frequency range different than the first radio frequency range; and fourth means coupled to the third means to transmit the frequency translated radio frequency signal.

Another feature of this invention is the provision of a transponder incorporating as the above-mentioned second means a three stage tunnel diode amplifier for both amplification and amplitude limiting in the radio frequency range, and a single stage tunnel diode amplifier incorporated as part of the above-mentioned fourth means to amplify and amplitude limit the frequency translated radio frequency signal output of the above-mentioned third means.

A further feature of this invention is the provision of an arrangement to provide a fixed frequency radio frequency signal to be employed when the transponder is a satellite communication transponder as the tracking signal to enable a ground station to track the satellite carrying the transponder, the tracking signal being coupled simultaneously through the power amplifier of the transponder transmitter with the radio frequency signals carrying the intelligence.

BRIEF DESCRIPTION OF THE DRAWING

The above-mentioned and other features and objects of this invention will become more apparent by reference to the following description taken in conjunction with the accompanying drawing, in which the sole FIGURE is a block diagram of the transponder in accordance with the principles of the present invention.

DESCRIPTION OF THE PREFERRED EMBODIMENT

Referring to the FIGURE, there is illustrated therein a block diagram of the transponder in accordance with the principles of the present invention. Before continuing with the description thereof, it should be pointed out that although certain frequencies and frequency ranges are indicated on the drawing these are only examples of the frequencies that can be employed. In addition, the gain (G) illustrated to be present in certain components of the transponder are also examples. The quantity of gain and the frequency values can, of course, obviously be adjusted to meet certain specific specifications for a specific transponder in accordance with the principles of this invention.

In accordance with the principles of this invention, the transponder illustrated in the FIGURE is a single conversion, direct RF design that utilizes tunnel diode amplifiers for amplification and amplitude limiting in the RF range. When operating in its limiting mode, the tunnel diode amplifier makes an excellent limiter exhibiting bandwidths in excess of 500 megacycles (m.c./p.s.), has extremely linear phase shift with less than 2 nanoseconds across the band, and negligible AM/PM conversion and a large dynamic amplitude range. The term "AM/PM conversion" has reference to the fact that varying signal strength or signal amplitude as received causes a translation or conversion from this AM signal to a PM signal which causes noise in a frequency modulation (FM) signal being propagated through a circuit such as the transponder of this invention. Thus, due to the use of the tunnel diode amplifiers in the transponder of this invention there is negligible AM/PM conversion and, thus, the FM signal transmitted through the transponder when employed in a communication system or the like is negligible and there is no appreciable noise present due to this AM/PM conversion.

More specifically, the transponder includes a receiver incorporating antenna 1 to receive the radio frequency signal and filter 2 to pass radio frequency signals in a predetermined radio frequency range, such as 7.968—8.168 gc./s. (gigacycles per second). The output of filter 2 is coupled to a three stage tunnel diode amplifier 3 wherein this amplifier is operating in its limiting mode and, thus, amplifies and amplitude limits the received radio frequency signal to limit the high power-interfering signals which could capture the transponder circuitry and render any intelligence such as distance information, direction information, data, voice and the like, carried by the radio frequency signal to be unintelligible.

The output of amplifier 3 is coupled to diode mixer and filter 4. The other input for mixer and filter 4 is provided from a local oscillator source including crystal oscillator 5 and frequency multiplier 6. Frequency multiplier 6 in the illustrated example of frequencies involved includes transistor frequency multiplier 7 and varactor frequency multiplier 8. The transistor frequency multiplier 7 is conventional and operable in the frequency range illustrated. However, after multiplication to the 192 m.c./p.s. range, the frequency multiplication cannot be carried on by a transistor frequency multiplier due to the high frequency limitation of such a circuitry. Thus, varactor frequency multiplier 8 is employed which incorporates a variable capacitive diode which generates in a conventional manner signals which are rich in harmonics and a filter to select the desired frequency multiplied output signal. The output from multiplier 6 is coupled through filter 9 and, hence, through hybrid coupler 10 to the other input of mixer and filter 4.

The output of mixer and filter 4 is in the 7.2—7.4 gs./s. RF range. It will be observed that this is the lower sideband output of the mixer with the filter adjusted to pass this lower sideband. However, it is obvious that the filter of mixer and filter 4 could have been adjusted to pass the upper sideband output of the mixer and utilize this RF range for transmission from the transponder.

The output of mixer and filter 4 is coupled to one stage tunnel diode amplifier 11 and, hence, to directional coupler 12 prior to being coupled to the power amplifier tube of the transmitter of the transponder illustrated as being traveling wave tube (TWT) power amplifier 13 whose output is then coupled to antenna 14 for transmission from the transponder.

The single RF conversion which takes place in mixer and filter 4 is for the purpose of providing a different band of RF signals for reception and a different band of RF signals for transmission. However, it will be obvious that the amplification and amplitude limiting to remove high-power interfering signals is accomplished in the RF frequency range rather than in the intermediate frequency range of the prior art transponders mentioned hereinabove under the section "Background of the Invention."

Provision is provided in the transponder of this invention for providing a tracking beacon signal where the transponder is carried by a carrier, such as a satellite, so that the ground station communicating therewith can follow the motion of the vehicle carrying the transponder. In accordance with this invention this tracking beacon signal is provided by varactor frequency multiplier 15 coupled to hybrid coupler 10 to multiply the frequency output of filter 9 so as to place this tracking beacon signal outside the frequency range in which an intelligence signal would be carried by a radio frequency carrier. The output of multiplier 15 is coupled to directional coupler 12 so that amplifier 13 will simultaneously amplify the signals in frequency band 7.2–7.2 gc./s. and the tracking beacon signal which in the example illustrated is 7.68 gc./s. Directional coupler 12 is a device that will not unduly attenuate the output of amplifier 11 but may be so constructed that the beacon signal is attenuated in coupler 12 which is of no consequence, since all that has to be provided to the ground station is the signal at this frequency with sufficient amplitude so that the ground station tracking receiver can lock onto this beacon signal to operate the antenna in such a manner as to follow the satellite carrying the transponder of this invention.

Tests on the transponder as illustrated in the FIGURE have indicated that the three stage diode tunnel amplifier 3 followed by mixer and filter 4 and tunnel diode amplifier 11 vary closely approximates an ideal limiter thereby providing not only immunity to high power interference signals but wide dynamic and static bandwidth, large dynamic amplitude range and low AM/PM conversion.

While I have described above the principles of my invention in connection with specific apparatus, it is to be clearly understood that this description is made only by way of example and not as a limitation to the scope of my invention as set forth in the objects thereof and in the accompanying claims.

I claim:

1. A transponder comprising:

first means to receive a first radio frequency signal disposed in a first radio frequency range;

a first tunnel diode amplifier having at least one stage, said first amplifier operating in its amplitude limiting mode and coupled to said first means to both amplify and amplitude limit said first radio frequency signal;

third means coupled to said second means to frequency translate said first radio frequency signal to a second radio frequency range different than said first radio frequency range; and fourth means coupled to said third means to transmit said frequency translated radio frequency signal.

2. A transponder according to claim 1, wherein said fourth means includes a second tunnel diode amplifier having one stage, said second amplifier operating in its amplitude limiting mode and coupled to said third means to both amplify and amplitude limit said frequency translated radio frequency signal, and fifth means coupled to said second amplifier to increase the power of and transmit said frequency translated radio frequency signal.

3. A transponder according to claim 2, wherein said fifth means includes a traveling wave tube amplifier.

4. A transponder according to claim 1, wherein said first amplifier includes three stages, each of said stages operating in its amplitude-limiting mode.

5. A transponder according to claim 1, wherein said third means includes mixer means coupled to said second means, a crystal oscillator, and a frequency multiplier means coupled between said oscillator and said mixer means.

6. A transponder according to claim 1, wherein said first amplifier includes three stages having its first stage coupled to said first means, each of said stages operating its amplitude limiting mode;

said third means includes mixer means coupled to the last stage of said three stages, a crystal oscillator, and a first frequency multiplier means coupled between said oscillator and said mixer means; and said fourth means includes a second tunnel diode amplifier having one stage, said second amplifier operating in its amplitude limiting mode coupled to said mixer means, and a traveling wave tube amplifier coupled to said second amplifier.

7. A transponder comprising:

first means to receive a first radio frequency signal disposed in a first radio frequency range;

second means coupled to said first means to amplify and amplitude limit said first radio frequency signal;

third means coupled to said second means to frequency translate said first radio frequency signal to a second radio frequency signal range different than said first radio frequency range;

fourth means coupled to said third means to transmit said frequency-translated radio frequency signal; and fifth means coupled to said third means and said fourth means to produce a fixed frequency radio frequency signal in juxtaposition with said second radio frequency range for transmission by said fourth means simultaneously with said frequency translated radio frequency signal.

8. A transducer comprising:

first means to receive a first radio frequency signal disposed in a first radio frequency range;

second means coupled to said first means to amplify and amplitude limit said first radio frequency signal;

third means coupled to said second means to frequency translate said first radio frequency signal to a second radio frequency range different than said first radio frequency range;

fourth means coupled to said third means to transmit said frequency translated radio frequency signal;

said second means including a three stage tunnel diode amplifier having its first stage coupled to said first means, each of said stages operating in its amplitude limiting mode;

said third means including mixer means coupled to the last stage of said three-stage amplifier, a crystal oscillator, and a first frequency multiplier means coupled between said oscillator and said mixer means;

said fourth means including a one stage tunnel diode amplifier operating in its amplitude limiting mode coupled to said mixer means, and a traveling wave tube amplifier coupled to said one-stage amplifier; and a second frequency multiplier means coupled to said first multiplier means and said traveling wave tube amplifier to produce a fixed radio frequency signal in juxtaposition with said second radio frequency range for transmission by said traveling wave tube amplifier simultaneously with said frequency translated radio frequency signal.